United States Patent
Miura

(10) Patent No.: US 9,648,247 B2
(45) Date of Patent: May 9, 2017

(54) IMAGE PICKUP APPARATUS AND CONTROL METHOD OF IMAGE PICKUP APPARATUS

(71) Applicant: Olympus Corporation, Hachioji-shi, Tokyo (JP)

(72) Inventor: Toshimasa Miura, Machida (JP)

(73) Assignee: Olympus Corporation, Hachioji-shi, Tokyo (JP)

( * ) Notice: Subject to any disclaimer, the term of this patent is extended or adjusted under 35 U.S.C. 154(b) by 0 days.

(21) Appl. No.: 14/918,975

(22) Filed: Oct. 21, 2015

(65) Prior Publication Data
US 2016/0227091 A1 Aug. 4, 2016

(30) Foreign Application Priority Data
Feb. 3, 2015 (JP) ................................ 2015-019690

(51) Int. Cl.
*H04N 5/235* (2006.01)
*H04N 5/353* (2011.01)

(52) U.S. Cl.
CPC ......... *H04N 5/2353* (2013.01); *H04N 5/2352* (2013.01); *H04N 5/3532* (2013.01); *H04N 5/2355* (2013.01)

(58) Field of Classification Search
None
See application file for complete search history.

(56) References Cited

U.S. PATENT DOCUMENTS

| 7,292,274 B2 * | 11/2007 | Nakamura | H04N 3/1562 348/272 |
| 7,336,308 B2 * | 2/2008 | Kubo | H04N 5/2353 348/229.1 |
| 7,760,247 B2 * | 7/2010 | Okamura | H04N 5/23245 348/222.1 |

FOREIGN PATENT DOCUMENTS

JP 2013-179488 9/2013

* cited by examiner

*Primary Examiner* — Mark T Monk
(74) *Attorney, Agent, or Firm* — John C. Pokotylo; Straub & Pokotylo

(57) ABSTRACT

An image pickup apparatus comprises: an image pickup device that generates an image data; a mechanical shutter that controls shielding and passing of object light; an image processing section that amplifies pixel values of respective pixels of the image data with a gain which is uniform irrespective of the pixel values; and a CPU that sets a shutter type to be used, controls the image pickup device when the electronic shutter is used, and sets the gain of amplification by the image processing section to have different values in accordance with which shutter is to be used.

11 Claims, 7 Drawing Sheets

IMAGE PICKUP APPARATUS AND CONTROL METHOD OF IMAGE PICKUP APPARATUS

CROSS REFERENCE TO RELATED APPLICATION

This application claims benefit of Japanese Application No. 2015-19690 filed in Japan on Feb. 3, 2015, the entire contents of which are incorporated herein by this reference.

BACKGROUND OF THE INVENTION

1. Field of the Invention

The present invention relates to an image pickup apparatus and a control method of the image pickup apparatus, in which a mechanical shutter and an electronic shutter are usable.

2. Description of the Related Art

Conventionally, in an image pickup apparatus such as a digital camera, a mechanical shutter in which an exposure time is controlled by mechanically driving shutter curtains (or shutter blades or the like) for shielding object light has been used.

By contrast, recently, an image pickup apparatus equipped with an image pickup mode by an electronic shutter which controls an exposure time by controlling reset timing and readout timing of an image pickup device has been proposed.

The electronic shutter is capable of reducing noise (no running sound and no running stop sound of a shutter is generated), improving continuous shooting performance (there is no need of reading an image data while maintaining a state of shielding light, and an exposure for a next frame starts immediately after the reading), and facilitating low power consumption (no electric power is needed for mechanical running of the shutter curtains or the like), etc. in comparison with the mechanical shutter.

Further, there has been proposed a technique of equipping the image pickup apparatus with both of the mechanical shutter and the electronic shutter, and using one of the mechanical shutter and the electronic shutter properly.

First, in the current general technique, since a curtain speed of the electronic shutter by rolling readout of a CMOS image sensor, for example, is considerably slower than a curtain speed of a mechanical shutter such as a focal plane shutter, an image of a moving object with large distortion is picked up in a case where the electric shutter is used in comparison with a case where the focal plane shutter is used. On the other hand, when the mechanical shutter is used, since a mechanical drive mechanism is to be operated, power consumption larger than that when the electronic shutter is used is required.

Therefore, for example, in Japanese Patent Laid-Open Publication No. 2013-179488, there is described a technique of detecting motion of an object and performing photographing using the electronic shutter when the motion of the object is small, and performing photographing using the mechanical shutter when the motion of the object is large. Thereby, it is made possible to reduce the distortion of the moving object and to facilitate low power consumption.

SUMMARY OF THE INVENTION

An image pickup apparatus according to an aspect of the present invention comprises: an image pickup device that generates an image data by performing photoelectric conversion of object light by a plurality of pixels, and sequentially reads pixel values of the generated image data; a mechanical shutter that controls an exposure time of the image data generated by the image pickup device by controlling shielding and passing of the object light; an image pickup control section that controls, when the mechanical shutter is used, sequential reading of the pixel values from the image pickup device after the exposure time elapses and the object light is shielded, and controls, when an electronic shutter is used, sequential resetting of the pixels of the image pickup device and sequential reading of the pixel values from the pixels for which the exposure time elapses; a gain multiplying section that amplifies the pixel values of the pixels of the image data with a gain which is uniform irrespective of magnitude of the pixel values; and a control section that controls which of the mechanical shutter and the electronic shutter is to be used, and sets the gain to have different values in accordance with which of the mechanical shutter and the electronic shutter is to be used.

A control method of an image pickup apparatus according to an aspect of the present invention is for the image pickup apparatus comprising an image pickup device that generates an image data by performing photoelectric conversion of object light by a plurality of pixels, and sequentially reads pixel values of the generated image data, and a mechanical shutter that controls an exposure time of the image data generated by the image pickup device by controlling shielding and passing of the object light, and the control method comprises: an image pickup control step of controlling, when the mechanical shutter is used, sequential reading of the pixel values from the image pickup device after the exposure time elapses and the object light is shielded, and controlling, when an electronic shutter is used, sequential resetting of the pixels of the image pickup device and sequential reading of the pixel values from the pixels for which the exposure time elapses; a gain multiplying step of amplifying the pixel values of the pixels of the image data with a gain which is uniform irrespective of magnitude of the pixel values; and a control step of controlling which of the mechanical shutter and the electronic shutter is to be used, and sets the gain to have different values in accordance with which of the mechanical shutter and the electronic shutter is to be used.

DETAILED DESCRIPTION OF THE PREFERRED EMBODIMENTS

Figure 1:
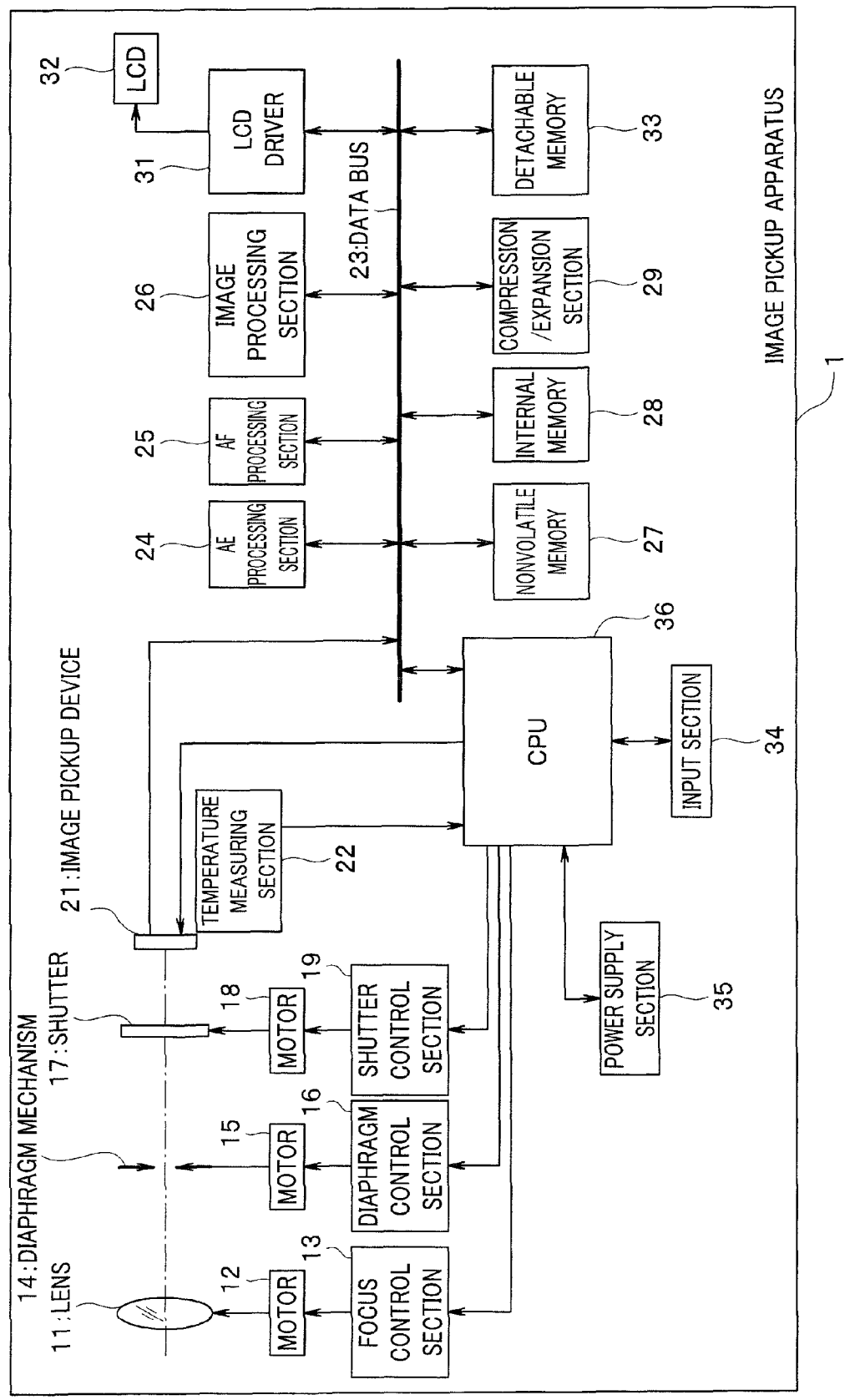
FIG. 1 is a block diagram showing a configuration of an image pickup apparatus in embodiment 1 of the present invention.

Hereinafter, embodiments of the present invention will be described referring to the drawings.

Embodiment 1

FIGS. 1 to 11 show embodiment 1 of the present invention, and FIG. 1 is a block diagram showing a configuration of an image pickup apparatus 1.

The image pickup apparatus 1 is configured, for example, as a digital camera, and is provided with a lens 11, a motor 12, a focus control section 13, a diaphragm mechanism 14, a motor 15, a diaphragm control section 16, a shutter 17, a motor 18, a shutter control section 19, an image pickup device 21, a temperature measuring section 22, a data bus 23, an AE processing section 24, an AF processing section 25, an image processing section 26, a nonvolatile memory 27, an internal memory 28, a compression/expansion section 29, an LCD driver 31, an LCD 32, a detachable memory 33, an input section 34, a power supply section 35, and a CPU 36.

The lens 11 is an optical system for forming an optical image of an object on the image pickup device 21.

The motor 12 is a lens driving section for driving the lens 11.

The focus control section 13 drives the lens 11 at a focusing portion by controlling the motor 12 based on an instruction from the CPU 36.

The diaphragm mechanism 14 restricts a passing range of an object luminous flux that reaches the image pickup device 21 through the lens 11 by changing an aperture diameter. By the change of the aperture diameter of the diaphragm mechanism 14, for example, brightness of the optical image of the object changes, and a degree of blur or the like changes.

The motor 15 is a diaphragm driving section that changes the aperture diameter by driving the diaphragm mechanism 14.

The diaphragm control section 16 controls the motor 15, based on an instruction from the CPU 36, to drive the diaphragm mechanism 14 and performs adjustment to a predetermined aperture diameter.

The shutter 17 is a mechanical shutter that controls an exposure time of an image data generated by the image pickup device 21 by controlling shielding and passing of object light. The shutter 17 is configured as a focal-plane shutter having a front curtain and a rear curtain, as a specific example.

The motor 18 is a shutter driving section that drives the front curtain and the rear curtain of the shutter 17 to charged states.

The shutter control section 19 first releases the front curtain out of the front curtain and the rear curtain charged by the motor 18, and thereafter releases the rear curtain at timing when the exposure time elapses, and thereby controls a passing time period of the object light, i.e. the exposure time by an opening/closing operation of the shutter 17.

The image pickup device 21 is an image pickup section that has a plurality of pixels arranged two-dimensionally, and generates an image by performing photoelectric conversion of the object light incident through the lens 11, the diaphragm mechanism 11 and the shutter 17 which is in an open state, and sequentially reads pixel values of the generated image data. Here, each of the pixels is configured to include a photodiode which generates electric charge of an amount according to a light receiving amount.

The image data, which is analog, generated by the image pickup device 21 is converted into a digital image data by an A/D converter, not shown, which is provided inside or outside of the image pickup device 21, and is thereafter transferred via the data bus 23 and stored temporally in the internal memory 28.

The temperature measuring section 22 measures a temperature of the image pickup device 21, or a temperature in the vicinity of the image pickup device 21 in the image pickup apparatus 1, and outputs the measured temperature to the CPU 36.

The data bus 23 is a bus line for transferring various data and control signals generated at one place in the image pickup apparatus 1 to another place in the image pickup apparatus 1. The data bus 23 in the present embodiment is connected to the image pickup device 21, the AE processing section 24, the AF processing section 25, the image processing section 26, the nonvolatile memory 27, the internal memory 28, the compression/expansion section 29, the LCD driver 31, the detachable memory 33, and the CPU 36.

The AE processing section 24 is a luminance detecting section that measures a luminance of the object based on the image data obtained by the image pickup device 21, and further is an luminance distribution detecting section that detects a luminance difference (a luminance dynamic range) between a dark part and a bright part of the object based on the measured luminance. The AE processing section 24 outputs the measured luminance and luminance difference to the CPU 36.

The AF processing section 25 extracts a signal of a high frequency component from the image data obtained by the image pickup device 21, and acquires a focusing evaluation value by AF (auto focus) integration processing. The AF processing section 25 outputs the acquired focusing evaluation value to the CPU 36.

The image processing section 26 performs various types of image processing such as synchronization processing, gradation conversion processing, white balance processing, noise reduction processing, edge enhancement processing, gamma conversion processing, with respect to the image data read from the image pickup device 21.

Further, the image processing section 26 includes a high-dynamic-range synthesizing processing section that synthesizes a high-dynamic range image data based on a plurality of image data obtained by photographing in a high-dynamic-range (HDR) photographing mode with different exposures. Further, the image processing section 26 includes a moving body detecting section that detects a motion amount of the object based on the image data acquired for each frame, for example, when displaying a live view.

The nonvolatile memory 27 is a storage medium that stores, in a nonvolatile manner, information of various types concerning the image pickup apparatus 1 such as processing programs executed by the CPU 36, parameters necessary for executing the processing programs or set data by a user. The information that the nonvolatile memory 27 stores is read by the CPU 36.

The internal memory 28 is a storage section that temporally stores various data such as the image data obtained by the image pickup device 21 as described above, or the image data processed in the image processing section 26 or the compression/expansion section 29, and is a memory capable of performing high-speed writing/reading. Therefore, the internal memory 28 is used as a work memory when the image processing section 26 performs the various types of image processing.

When recording the image data, the compression/expansion section 29 reads the image data from the internal memory 28, compresses the read data according to a JPEG compression method, for example, and causes the compressed image data to be stored in the internal memory 28 again. A header and the like are added to the compressed image data thus stored in the internal memory 28 by the CPU 36, and the image data is regulated as an image file for record, and is recorded in the detachable memory 33 on the basis of control of the CPU 36.

Further, the compression/expansion section 29 performs expansion of the read image data. Specifically, when performing reproduction of the read image data, the JPEG file, for example, is read from the detachable memory 33 on the basis of control of the CPU 36, and is temporally stored in the internal memory 28. The compression/expansion section 29 reads the JPEG image data stored in the internal memory 28, expands the read JPEG image data according a JPEG expansion method, and causes the expanded image data to be stored in the internal memory 28.

The LCD driver 31 reads the image data stored in the internal memory 28, converts the read image data into a video signal, and drives and controls the LCD 32 to cause the LCD 32 to display an image based on the video signal. An image display performed by the LCD driver 31 includes a rec view display of displaying the image data immediately after photographing for a short time, a reproduction display of the JPEG file recorded in the detachable memory 33, the live view display, a menu display for performing setting with respect to the image pickup apparatus 1, etc.

The LCD 32 displays the image by the drive and control of the LCD driver 31 as described above, and displays information of various types concerning the image pickup apparatus 1.

The detachable memory 33 is a storage medium that records the image data in the nonvolatile manner, and is constituted by, for example, a memory card or the like which is attachable and detachable to and from the image pickup apparatus 1. Therefore, it is not necessary that the detachable memory 33 is configured to be inherent to the image pickup apparatus 1.

The input section 34 is an operation section for performing various operation inputs to the image pickup apparatus 1, and includes various operation buttons such as a power supply button for turning a power supply of the image pickup apparatus on/off, a release button for instructing a start of photographing an image, a reproduction button for reproducing the recorded image, a menu button for performing settings or the like of the image pickup apparatus 1, a cross-key for use in a selection operation of items, and an OK button for use in a deciding operation of the selected item. Here, the items that can be set using the menu button, the cross-key, the OK button and the like include photographing modes (a normal photographing mode, a high-dynamic-range photographing mode, etc.), selection of a file to be reproduced in a reproduction mode, and setting of ISO sensitivity (therefore, the input section 34 serves as a sensitivity setting section for setting the ISO sensitivity). When an operation is performed with respect to the input section 34, a signal corresponding to content of the operation is outputted from the input section 34 to the CPU 36.

The power supply section 35 supplies electric power to respective parts including the CPU 36 in the image pickup apparatus 1.

The CPU 36 is a control section that generally controls the respective parts in the image pickup apparatus 1. When an operation input is performed through the input section 34, the CPU 36 reads parameters necessary for processing from the nonvolatile memory 27 according to the processing program stored in the nonvolatile memory 27 and executes various sequences in accordance with the content of the operation.

The CPU 36 serves as an exposure value calculation section that calculates a diaphragm value, an exposure time (also referred to as a shutter speed) and ISO sensitivity which correspond to a proper exposure value, based on the luminance measured by the AE processing section 24 using a program diagram or the like. The CPU 36 controls which of the mechanical shutter 17 and an electronic shutter is to be used, and sets a gain by which the pixel value is multiplied to have a different value in accordance with which shutter is to be used, as described later. Then, the CPU 36 performs control of the diaphragm mechanism 14 through the diaphragm control section 16 based on the calculated diaphragm value, and performs control of the shutter 17 through the shutter control section 19 or operates a device shutter by controlling exposure timing of the image pickup device 21 based on the calculated exposure time, and causes the image pickup device 21 or the image processing section 26 to perform amplification based on the calculated ISO sensitivity. Thus, an automatic exposure (AE) control based on an exposure calculation result is performed.

Further, the CPU 36 performs contrast AF by driving the lens 11 though the focus control section 13 so that the focusing evaluation value acquired by the AF processing section 25 becomes the maximum value. Besides, it is a matter of course that the AF is not limited to such contrast AF and, for example, it may be configured such that phase difference AF is performed using a dedicated phase difference AF sensor (or using phase difference detection pixels on the image pickup device 21).

Furthermore, the CPU 36 performs control of an exposure amount and photographing timing in image photographing of a still image or a moving image. For example, the CPU 36 functions as an image pickup control section that, when using the mechanical shutter, controls sequential reading of the pixel values from the image pickup device 21 with the light shielded after elapse of the exposure time, and when the electronic shutter is used, sequentially resets respective pixels of the image pickup device 21 and controls sequential reading of the pixel values from the pixels for which the exposure time elapses.

Then, the CPU 36 performs control of conversion of the image data generated by the image processing section 26 into a file format, and recording of the converted data in the detachable memory 33.

Figure 2:
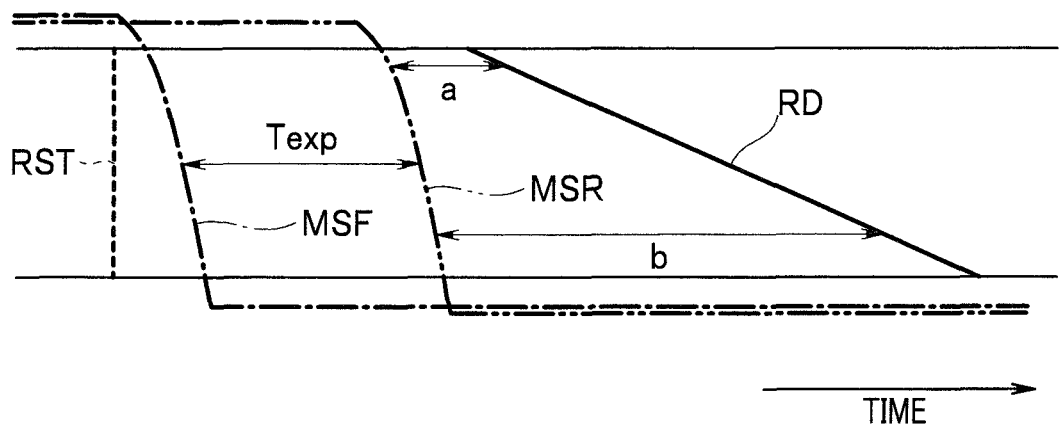
FIG. 2 is a timing chart showing an image pickup operation when a mechanical shutter is used in the embodiment 1.
Figure 3:
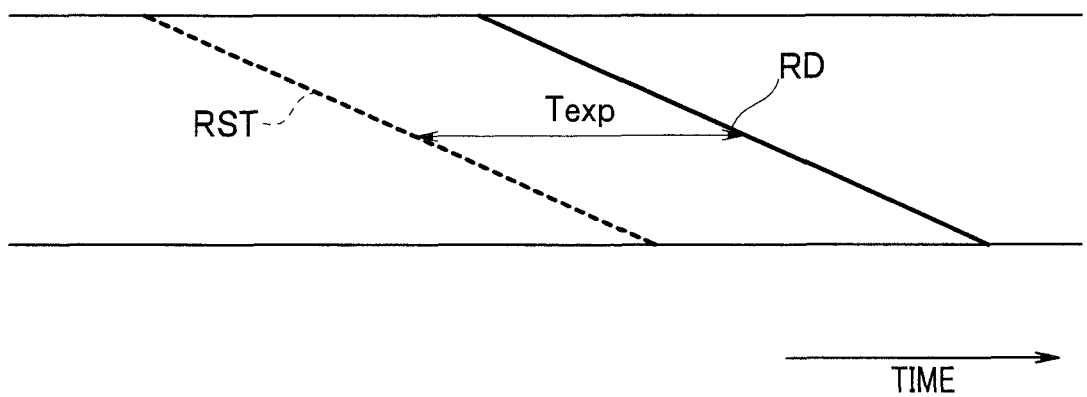
FIG. 3 is a timing chart showing an image pickup operation when an electronic shutter is used in the embodiment 1.

FIG. 2 is a timing chart showing an image pickup operation when the mechanical shutter is used. In FIG. 2 and FIG. 3 which will be described next, the horizontal axis indicates elapse of time, and the vertical axis indicates rows of respective horizontal lines arranged in a vertical direction of the image pickup device 21.

In the mechanical shutter after being charged, the front curtain is in a light shielding state, and the rear curtain is in an open state. In the state where the light is shielded by the front curtain, first, all the pixels are reset RST in a lump.

Thereafter, the front curtain MSF is released to start running to perform exposure sequentially from the first line to the last line. At a point in time when an exposure time Texp for the first line elapses, the rear curtain MSR is released to start running, to terminate the exposure sequentially from the first line to the last line. At this time, the shutter 17 is configured such that a running characteristic of the front curtain MSF and a running characteristic of the rear curtain MSR are equal to each other, and therefore the exposure time at an arbitrary line becomes Texp.

When the running of the rear curtain terminates and the image pickup device 21 is brought into the light shielding state, readout RD of the pixel values of the respective pixels is sequentially performed by rolling readout, for example, by one line. When reading the pixel values after termination of the exposure, the image pickup device 21 is in the light shielding state, and therefore accumulation of new charge of each pixel is not performed. Since a time period necessary for performing the rolling readout of all the lines is longer than a time period necessary for the mechanical shutter to run through all the lines, a time interval from the time of termination of the exposure to the time of readout at a reading start line is time a which is the shortest, and thereafter the time interval becomes gradually longer, and the time interval at a reading end line is time b (here, b>a) which is the longest.

On the other hand, FIG. 3 is a timing chart showing an image pickup operation when the electronic shutter is used.

When the electronic shutter is used, the mechanical shutter 17 is retained in the open state in advance, and the object light is continuously incident on the image pickup device 21.

In this state, the reset RST of the respective pixels is sequentially performed at the same speed as the rolling readout (although the electronic shutter does not have a shutter curtain to run, this speed is also referred to as a curtain speed as a metaphor of an element that performs the similar function). For an arbitrary pixel, when the exposure time Texp elapses from the reset RST, the readout RD of the pixel value is performed.

That is, since the termination of exposure and the readout of the pixel values are simultaneous in the electronic shutter, a time period from the termination of exposure to the readout of the pixel values is "0" evenly for all the pixels, and there is no difference between the time period at the reading start line and the time period at the reading end line. Further, when the electronic shutter is used, since the object light is incident even immediately after the readout, accumulation of new charge is performed at all times.

Figure 4:
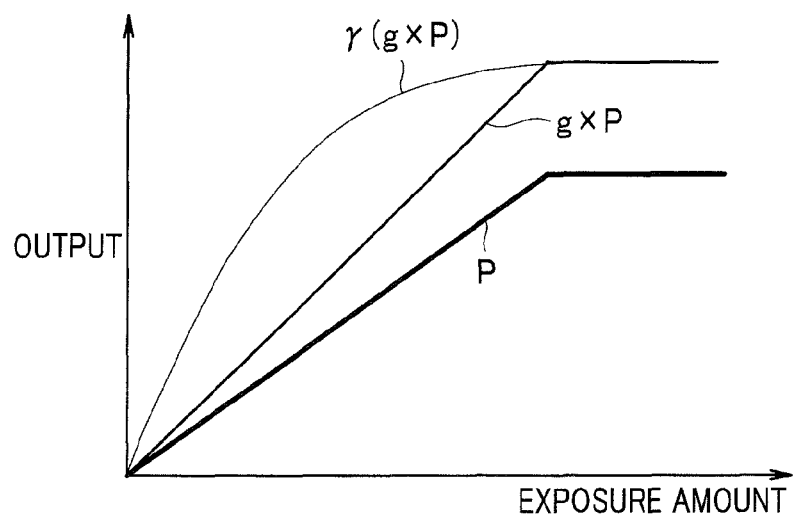
FIG. 4 is a diagram showing an adjustment of a signal value which is performed with respect to a pixel value in the embodiment 1.

FIG. 4 is a diagram showing an adjustment of a signal value which is performed with respect to the pixel value.

First, a pixel value P obtained by the pixel increases, e.g. proportionally, as the exposure amount increases until a saturation level is reached, and after the saturation level is reached, a level does not change if the exposure amount increases.

With respect to the pixel value P of each of the pixels of the image data, first, amplification is performed by multiplying the pixel value by a gain g, which is uniform irrespective of magnitude of the pixel value, by a gain multiplication section (a linear amplification section), to obtain g×P. A value of the gain g is determined such that a pixel value corresponding to a saturation charge amount is an upper limit of an output dynamic range (i.e. the maximum luminance value). Here, the gain multiplication section corresponds to, for example, an amplification function of the image pickup device 21, amplification processing performed by the image processing section 26, or the like.

Further, in the image processing section 26, gamma conversion processing is performed with respect to the pixel value g×P of each of the pixels of the image data which is obtained by amplification by the above-mentioned gain multiplication section, so that γ (g×P) is obtained. Here, the gamma conversion processing is processing of converting an inputted pixel value by a gamma curve γ for changing the inputted pixel value with a different amplification factor in accordance with magnitude of the pixel value. Thus, the gamma conversion processing performed by the image processing section 26 corresponds to a gamma conversion section (a non-linear amplification section).

Figure 5:
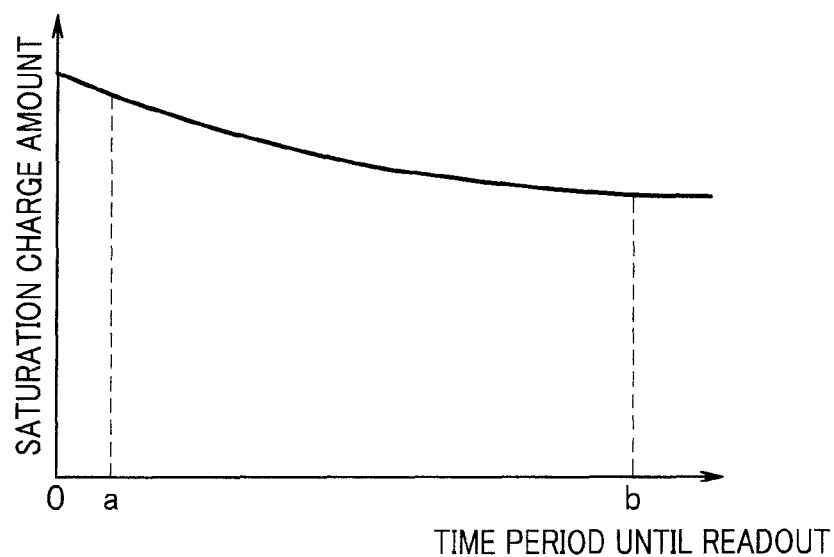
FIG. 5 is a diagram showing a state in which a saturation charge amount accumulated in a photodiode of a pixel decreases as a time period from termination of exposure to readout of the pixel value increases in the embodiment 1.

FIG. 5 is a diagram showing a state in which a saturation charge amount accumulated in a photodiode of the pixel decreases as a time period from the termination of exposure to the readout of the pixel value increases.

It is known that leakage charge is generated in the photodiode provided in each of the pixels, and not only the accumulated charge is leaked after the termination of exposure but also, for example, leakage charge is generated during accumulation of new charge by performing the photoelectric conversion.

At this time, the saturation charge amount accumulated in the photodiode of the pixel decreases, for example monotonously, as the time elapses from the termination of exposure, and a decrease amount at the reading end line which is read at the time b is larger than a decrease amount at the reading start line which is read at the time a.

Therefore, there is an advantage that a loss of the accumulated charge in the case where the electronic shutter is used is smaller than that in the case where the mechanical shutter is used.

Figure 6:
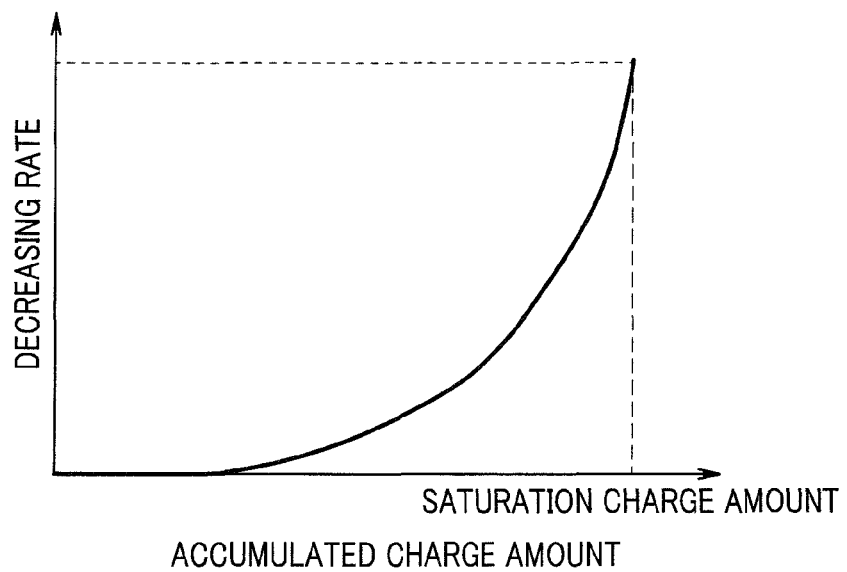
FIG. 6 is a diagram showing a state of a decrease rate in accordance with an amount of charge accumulated in the photodiode in the embodiment 1.

FIG. 6 is a diagram showing a state of a decrease rate in accordance with an amount of the charge accumulated in the photodiode.

The charge leaked from the photodiode increases as the charge amount accumulated in the photodiode increases, but is not simply proportional to the accumulated charge amount, and a leakage charge amount is of an almost negligible level when the accumulated charge amount is small but the leakage charge amount increases sharply as the saturation charge amount is approached. FIG. 6 shows an outline of tendency of such a decrease rate.

Figure 7:
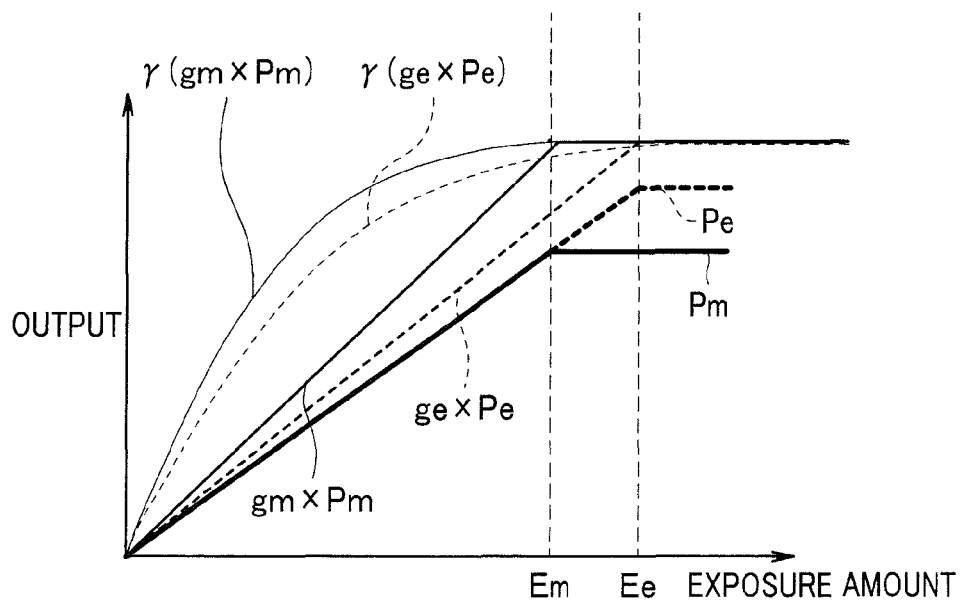
FIG. 7 is a diagram showing an example in which adjustments of signal values are performed with respect to a pixel value obtained by the electronic shutter and a pixel value obtained by the mechanical shutter, using the same gamma curve in the embodiment 1.

FIG. 7 is a diagram showing an example in which adjustments of signal values are performed with respect to a pixel value obtained by the electronic shutter and with respect to a pixel value obtained by the mechanical shutter, using the same gamma curve. It is noted that in FIG. 7 and in FIG. 8 which is described later, as a pixel value Pm in the case of the mechanical shutter, a pixel value obtained at the last line (i.e. a pixel value at a line where the decrease of the charge amount by the leakage charge is the largest in the image) is shown.

As described above, since the termination of exposure and the reading of the pixel values are simultaneous in the case of the electronic shutter, the charge leaked from the photodiode after the termination of exposure is substantially "0".

By contrast, in the case of the mechanical shutter, the pixel value read at the reading end line is smaller than the pixel value read at the reading start line (in particular, at a larger decrease rate in a region close to the saturation charge amount).

Therefore, since a saturation charge amount of a pixel value Pe which is read from the pixel after the exposure using the electronic shutter is larger than a saturation charge amount of a pixel value Pm read from the pixel after the exposure using the mechanical shutter, a high pixel value corresponding to a larger exposure amount (the maximum exposure amount Ee larger than the maximum exposure amount Em when the mechanical shutter is used) is further obtained as an output, so that a dynamic range is broad. Therefore, the gain g which is determined such that the pixel value corresponding to the saturation charge amount is the upper limit value of the output dynamic range takes different values for the pixel value Pe and for the pixel value Pm, and a gain ge corresponds to the pixel value Pe and a gain gm corresponds to the pixel value Pm, wherein ge<gm.

At this time, in the case of the mechanical shutter, since the decrease amount of the charge at the reading start line differs from the decrease amount of the charge at the reading end line, a value of the gain gm to be multiplied such that the pixel value corresponding to the saturation charge amount is the upper limit value of the output dynamic range is different for each line. In this regard, in the present embodiment, it is configured that a value of the gain gm with which the pixel value corresponding to the saturation charge amount at the reading end line is the upper limit value of the output dynamic range is applied to all of the lines.

Thereby, the pixel value corresponding to the saturation charge amount can be the upper limit value of the output dynamic range for all of the pixels only by multiplying a uniform value of the gain g for the entirety of the image (besides, with respect to a pixel value which is multiplied by the gain gm such that a value exceeding the upper limit value of the output dynamic range is obtained, processing of rounding the value to the upper limit value is performed).

Thereafter, the gamma conversion is performed using the same gamma curve γ with respect to the pixel value ge×Pe obtained by multiplying the gain ge and the pixel value gm×Pm obtained by multiplying the gain gm, to obtain γ (ge×Pe) and γ(gm×Pm), and since ge<gm, the pixel values in a part of standard brightness (e.g. brightness of ⅛ of the output dynamic range) are such that γ (gm×Pm)>γ (ge×Pe), and the photographing using the electronic shutter is a low-ISO-sensitivity photographing in comparison with the photographing using the mechanical shutter (here, the ISO sensitivity of the image pickup apparatus 1 is determined by both of the gain g to be multiplied as a fixed value irrespective of the pixel value, and the gamma curve γ which is a conversion curve in accordance with the pixel value in the image processing).

Figure 8:
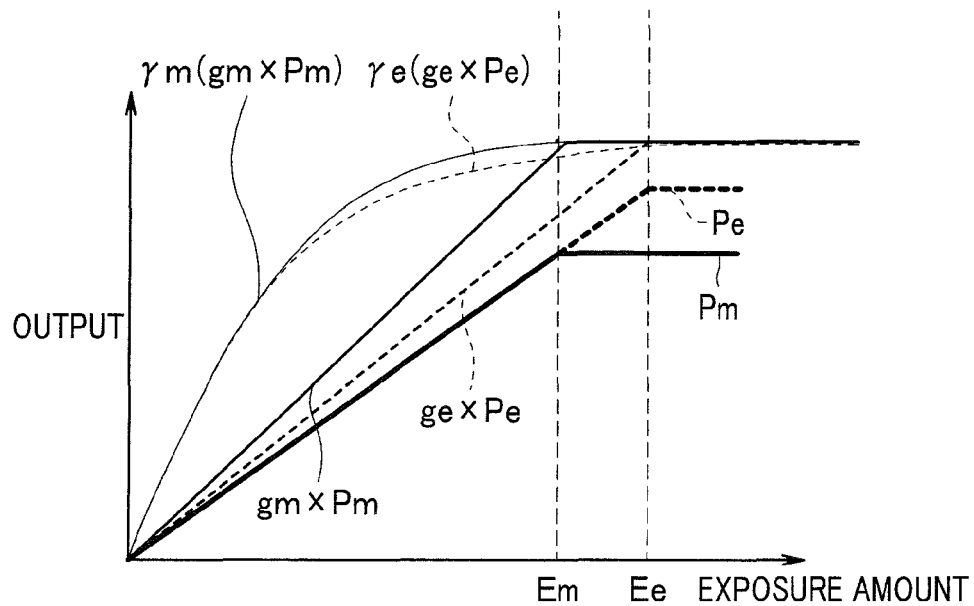
FIG. 8 is a diagram showing an example in which adjustments of signal values are performed with respect to a pixel value obtained by the electronic shutter and a pixel value obtained by the mechanical shutter, using different gamma curves in the embodiment 1.

Further, FIG. 8 is a diagram showing an example in which adjustments of signal values are performed with respect to the pixel value obtained by the electronic shutter and the pixel value obtained by the mechanical shutter, using different gamma curves.

In this example shown in FIG. 8, a state in which the pixel values ge×Pe and gm×Pm obtained by amplification by the fixed gains ge and gm, respectively are subjected to gamma conversion using different gamma curves γe and γm, respectively, and here, the gamma curves γe and γm are selected such that the photographing with the same ISO sensitivity is performed (specifically, such that gradients of output values in a part of brightness of ⅛ of the output dynamic range are the same). In this example, further, the pixel values in the part of the standard brightness (for example, in the part of brightness of ⅛ of the output dynamic range) are such that γm (gm×Pm)=γe (ge×Pe).

Here, the setting of ⅛ of the output dynamic range is an example and it is a value to be determined by design of a dynamic range of highlight and a dynamic range of shadow (dark side).

In both of the examples shown in FIG. 7 and FIG. 8, since the maximum exposure amount Ee with which the saturation charge amount is reached in the electronic shutter is larger than the maximum exposure amount Em with which the saturation charge amount is reached in the mechanical shutter, an exposure-amount dynamic range at the highlight side can be made broader by using the electronic shutter.

Figure 9:
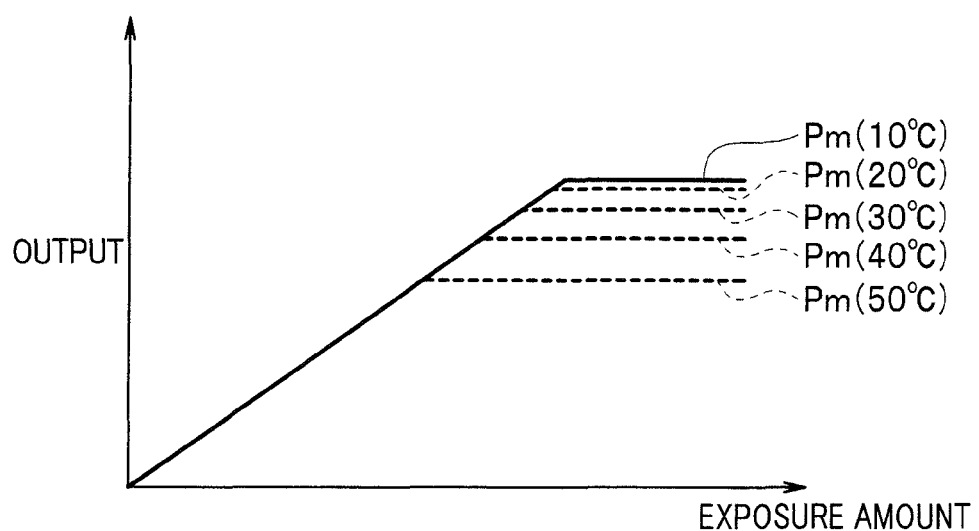
FIG. 9 is a diagram showing a state in which an output value from the pixel changes in accordance with a temperature of the image pickup device in the embodiment 1.

Further, FIG. 9 is a diagram showing a state in which an output value from the pixel changes in accordance with the temperature of the image pickup device 21. FIG. 9 shows one example of the pixel value Pm outputted after the exposure in the image pickup device 21 at temperatures of 10° C., 20° C., 30° C., 40° C. and 50° C. using the mechanical shutter.

The photodiode provided at each pixel has a characteristic such that the saturation charge amount decreases as the temperature of the image pickup device 21 becomes high.

Therefore, as shown in the figure, the upper limit of the pixel value Pm outputted from the image pickup device 21 becomes low as the temperature becomes high, and it is understood that when the temperature of the image pickup device 21 is high, the dynamic ranges (the output dynamic range and the exposure-amount dynamic range) become narrow and it is necessary to perform amplification by the gain gm having magnitude in accordance with the temperature.

The gain gm has to be set such that $$gm = Poutmax \times Pmmax(t),$$

where Pmmax(t) is a pixel value corresponding to a saturation charge amount obtained at the last line at temperature t° C. of the image pickup device 21, and Poutmax is the upper limit value of the output dynamic range.

Besides, the pixel value Pm obtained with the mechanical shutter is described here as an example, the pixel value Pe obtained with the electronic shutter has a similar temperature characteristic, and it is necessary to perform amplification by the gain ge having magnitude in accordance with the temperature.

The gain ge has to be set such that $$ge = Poutmax \times Pemax(t)$$

where Pemax(t) is a pixel value corresponding to a saturation charge amount obtained at temperature t° C. of the image pickup device 21 in the same manner as the above-mentioned gain gm.

At this time, if γ remains to have the same value, the sensitivity (ISO sensitivity) raises by an amount corresponding to the gain rise, and therefore it is necessary to adjust γ so that the sensitivity in the part of ⅛ of the dynamic range does not change.

Thus, although there is a demerit that distortion of the moving object is caused in the image since the curtain speed in the electronic shutter photographing is slow than that in the mechanical shutter photographing, there are merits that (1) photographing at low ISO sensitivity is made possible, and (2) the exposure-amount dynamic range on the highlight side can be made broad, since the saturation charge amount is large.

Therefore, in the image pickup apparatus 1 of the present embodiment, it is configured such that automatic setting of a shutter type can be performed in accordance with various conditions when performing photographing so as to take advantage of respective merits of the electronic shutter and the mechanical shutter.

Figure 10:
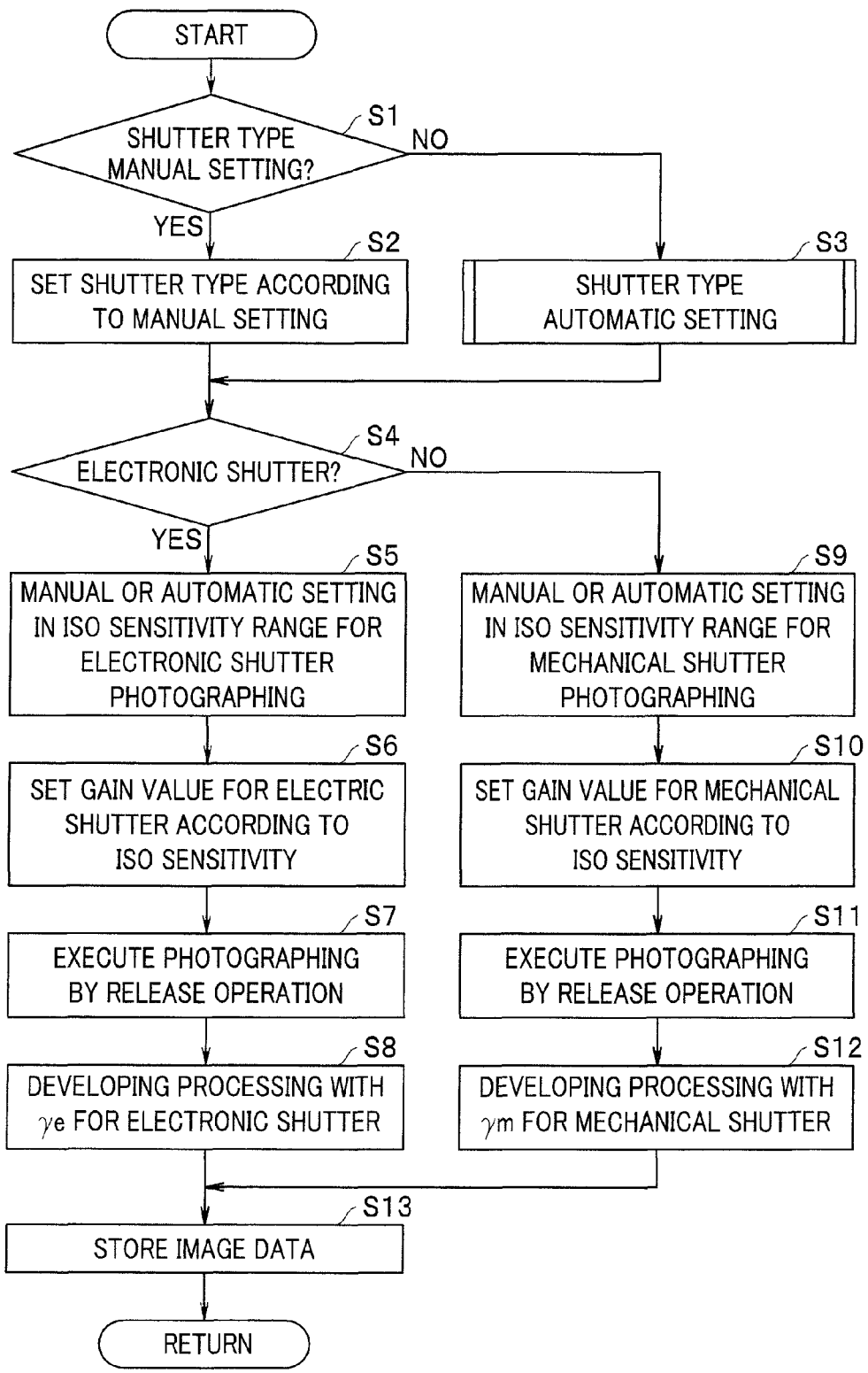
FIG. 10 is a flowchart showing the image pickup operation of the image pickup apparatus in the embodiment 1.

FIG. 10 is a flowchart showing the image pickup operation of the image pickup apparatus 1.

When the procedure enters this processing from main processing not shown, the CPU 36 determines whether or not manual selection of the shutter type is set (Step S1).

In this step, if it is determined that the manual selection is set, the CPU 36 sets the shutter type to one of the electronic shutter and the mechanical shutter in accordance with the manual setting (Step S2).

Further, if it is determined that manual selection is not set, the CPU 36 performs the automatic setting of the shutter type as described later referring to FIG. 11 (Step S3).

After the shutter type is set by performing the processing of Step S2 or Step S3, the CPU 36 determines whether the electronic shutter is set or not (Step S4).

If it is determined that the electronic shutter is set, the CPU 36 sets the ISO sensitivity as follows: if the ISO sensitivity is manually set, the ISO sensitivity is set in accordance with the manual setting, and if the ISO sensitivity is not manually set, the ISO sensitivity is set in accordance the program diagram or the like by automatic processing, within an ISO sensitivity range in which the ISO sensitivity can be set when the electronic shutter photographing is performed (Step S5).

Here, since the electronic shutter is capable of performing the lower ISO sensitivity photographing in comparison with the mechanical shutter, an ISO sensitivity range in which the sensitivity is settable when the electronic shutter is used and an ISO sensitivity range in which the sensitivity is settable when the mechanical shutter is used are different from each other, and here since the electronic shutter is used, the ISO sensitivity is set within the ISO sensitivity range in accordance with the electronic shutter photographing.

Next, the CPU 36 sets a value of the gain ge for the electronic shutter in accordance with the set ISO sensitivity (Step S6). When setting the gain ge, it is more preferable to take account of the temperature of the image pickup device 21 obtained from the temperature measuring section 22, as described above.

Then, when a release operation for instructing a photographing start of an image by the release button of the input section 34, an image pickup operation, in which exposure of the image pickup device 21 is performed using the electronic shutter and an image data is read, is executed on the basis of control of the CPU 36 (Step S7).

When the image data is thus obtained, the image processing of various types is performed and, for example, the gamma conversion using the gamma curve γe for the electronic shutter is performed as part of developing processing in the image processing section 26 on the basis of control of the CPU 36 (Step S8). Besides, the gamma curve γe for the electronic shutter is used here, but it is possible to use the gamma curve γ which is common with the mechanical shutter as shown in FIG. 7.

On the other hand, if it is determined that the electronic shutter is not set (that is, the mechanical shutter is set) in Step S4, the CPU 36 sets the ISO sensitivity as follows: if the ISO sensitivity is manually set, the ISO sensitivity is set in accordance with the manual setting, and if the ISO sensitivity is not manually set, the ISO sensitivity is set in accordance the program diagram or the like by automatic processing, within an ISO sensitivity range in which the ISO sensitivity can be set when the mechanical shutter photographing is performed (Step S9).

Subsequently, the CPU 36 sets a value of the gain gm for the mechanical shutter in accordance with the set ISO sensitivity (Step S10). When setting the gain gm, it is more preferable to take account of the temperature of the image pickup device 21 obtained from the temperature measuring section 22, as described above.

Then, when a release operation for instructing a photographing start of an image by the release button of the input section 34, an image pickup operation, in which exposure of the image pickup device 21 is performed using the mechanical shutter and an image data is read, is executed on the basis of control of the CPU 36 (Step S11).

When the image data is thus obtained, the image processing of various types is performed and, for example, the gamma conversion using the gamma curve γm for the mechanical shutter is performed as part of developing processing in the image processing section 26 on the basis of control of the CPU 36 (Step S12). Besides, the gamma curve γm for the mechanical shutter is used here, but it is possible to use the gamma curve γ which is common with the electronic shutter as shown in FIG. 7.

As described above, in the image pickup apparatus 1 of the present embodiment, the gain g by which the pixel output is multiplied is set to have different values in accordance with the case where the electronic shutter is used and the case where the mechanical shutter is used (see FIG. 7), and further the gamma curve γ is set to be different curves, as necessary (see FIG. 8).

After performing the processing of Step S8 or Step S12, the CPU 36 stores the image data after the image processing as an image file in the detachable memory 33 (Step S13) and the procedure returns from this processing to the main processing.

Figure 11:
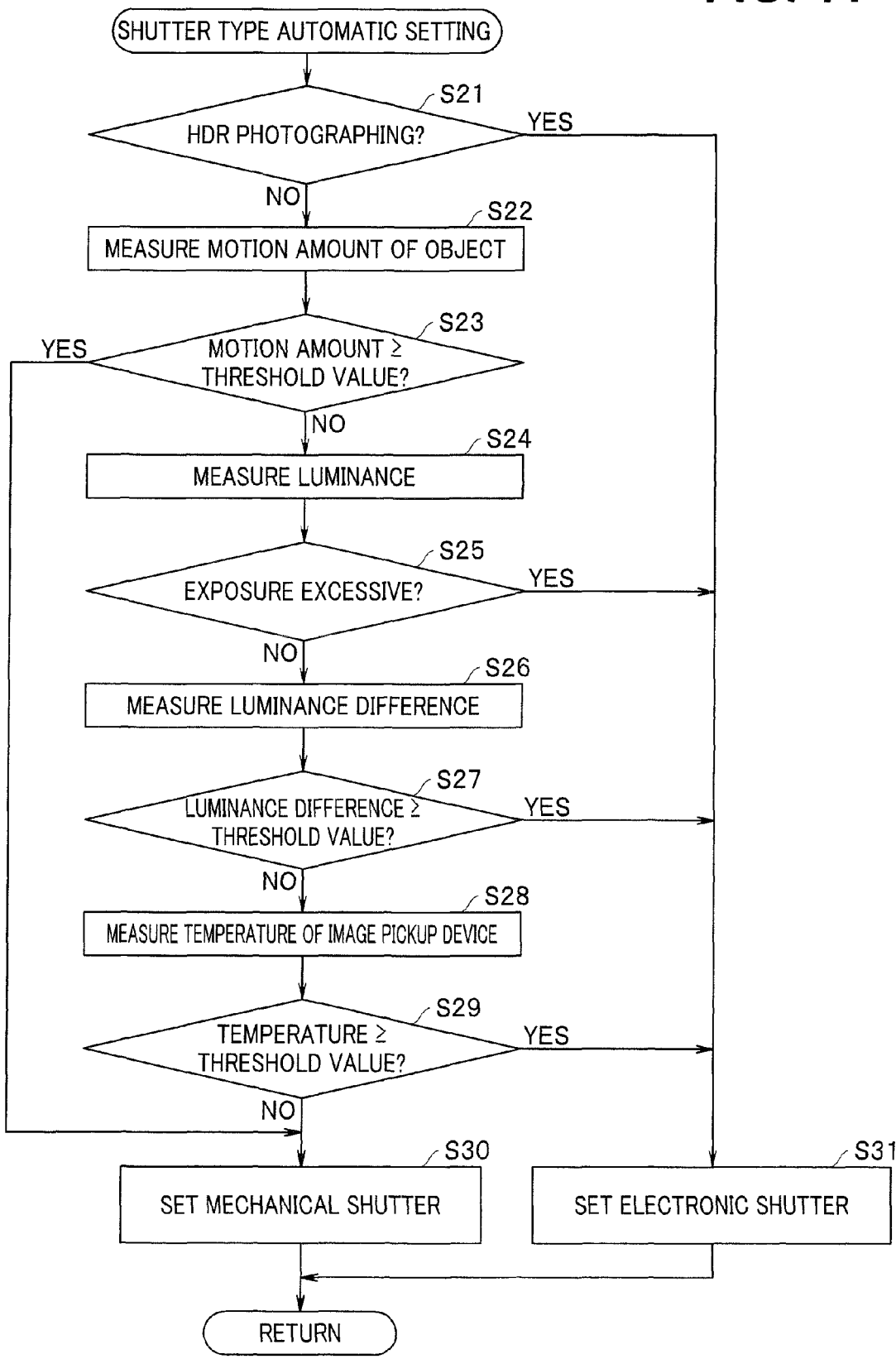
FIG. 11 is a flowchart showing details of processing of shutter type automatic setting in Step S3 of FIG. 10 in the embodiment 1.

FIG. 11 is a flowchart showing details of processing of the shutter type automatic setting in Step S3 in FIG. 10.

When the procedure enters this processing, first, the CPU 36 determines whether the high-dynamic-range (HDR) photographing mode is set or not (Step S21).

In this step, if it is determined that the high-dynamic-range (HDR) photographing mode is not set, the moving body detecting section of the image processing section 26 measures a motion amount of the object based on the respective image data which have been acquired for each frame in when displaying the live view (Step S22).

Then, the CPU 36 determines whether or not the measured motion amount is smaller than a preset threshold value (Step S23).

In this step, if it is determined that the motion amount is smaller than the threshold value, the AE processing section 24 measures luminance of the object (Step S24), and the CPU 36 determines whether or not the exposure value, which is determined by the exposure time, the diaphragm value and the ISO sensitivity that are currently set, exceeds the proper exposure value which is calculated by the CPU 36 based on the measured luminance (Step S25).

Here, if the luminance of the object is high, the proper exposure can be obtained by performing at least one of shortening of the exposure time (making the shutter speed faster), narrowing of the diaphragm and lowering of the ISO sensitivity.

However, there is a case where user's intention on image creation exists such as intention to blur the object intentionally to express the motion by slowing the shutter speed, or intention to make blurring of a background larger by opening the diaphragm, and in such a case, it is advantageous that the ISO sensitivity can be made lower, so that a range of photographing is broadened.

Therefore, in this Step S25, in a case where the exposure is excessive by the user's manual setting or the like, it is configured that switchover to the electronic shutter which is capable of coping with a lower ISO sensitivity is performed.

In this step, if it is determined that the exposure is not excessive, the AE processing section 24 measures a luminance difference (luminance dynamic range) of the object based on the measured luminance (Step S26).

The CPU 36 determines whether or not the measured luminance difference is smaller than a preset threshold value (Step S27), and if it is determined that the luminance difference is smaller than the threshold value, the CPU 26 obtains the temperature of the image pickup device 21 (or in the vicinity of the image pickup device 21 in the image pickup apparatus 1) measured by the temperature measuring section 22 (Step S28).

The CPU 36 determines whether or not the obtained temperature is lower than a preset threshold value (Step S29).

In this step, if it is determined that the temperature is lower than the threshold value or it is determined that the motion amount is not smaller than the threshold value, the mechanical shutter is selected and set to be used (Step S30).

Further, if it is determined in Step S21 that the high-dynamic-range (HDR) photographing mode is set, if it is determined in Step S25 that the exposure is excessive, if it is determined in Step S27 that the luminance difference (luminance dynamic range) is not smaller than the threshold value, and if it is determined in Step S29 that the temperature is not lower than the threshold value, the CPU 36 selects and sets the electronic shutter to be used (Step S31).

After the processing of Step S30 or Step S31 is thus performed and the shutter type is set, the procedure returns to the processing shown in FIG. 10.

Besides, although it is not shown in FIG. 11, since the electronic shutter and the mechanical shutter have different ISO sensitivity ranges in which the sensitivity can be set, if only one of the electronic shutter and the mechanical shutter can be used with the ISO sensitivity set by the sensitivity setting section, it is configured that the CPU 36 performs control to use the one.

Further, in FIG. 11, it is determined which of the electronic shutter and the mechanical shutter is to be used by a plurality of determination branches, but it is not necessary to perform all of these determinations and any one or more of these determinations (arbitrary combination of two or more determinations) may be performed. Alternatively, another determination branch may be added.

According to the embodiment 1 as described above, it is configured such that the gain is set to have different values in accordance with which of the mechanical shutter and the electronic shutter is to be used, and therefore an image data having a broad dynamic range in which brightness at the high luminance part is appropriate can be obtained in the case where either one of the shutters is used.

Further, when the electronic shutter is used, low-noise photographing at the lower ISO sensitivity is made possible, and in particular it is possible to perform photographing of the image having the broad dynamic range (e.g. exposure amount dynamic range) on the highlight side. On the other hand, when the mechanical shutter is used, the moving body distortion of the object caused by the rolling readout can be reduced since the curtain speed is high.

Further, since it is configured that the electronic shutter is used in the HDR photographing mode, the image having the broader dynamic range (e.g. exposure-amount dynamic range) can be obtained.

Furthermore, since it is configured to use the mechanical shutter when the motion amount of the object is large, the moving body distortion of the object can be effectively reduced.

Moreover, when the exposure is excessive by user's manual setting or the like, it is made possible to lower the set value of the ISO sensitivity by the changeover to the electronic shutter which is capable of coping with the lower ISO sensitivity, and the excessive exposure can be reduced.

In addition, when it is determined that the luminance difference of the object is large, it is configured to use the electronic shutter having the broader dynamic range (e.g. exposure-amount dynamic range), and therefore it is made possible to perform photographing of an image in which black defect of the dark part and halation in the bright part are suppressed.

Further, when the temperature of the image pickup device 21 is high, it is configured to use the electronic shutter with which the saturation charge amount is larger, and therefore the characteristic of the photodiode that the saturation charge amount decreases as the temperature rises high is compensated, so that the image having the broader dynamic range (e.g. exposure amount dynamic range) can be obtained.

Besides, the image pickup apparatus is mainly described in the foregoing description, the present invention may be directed to a control method of controlling the image pickup apparatus as described above, a control program for causing a computer to control the image pickup apparatus as described above, a non-transitory computer readable storage medium that stores the control program, etc.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
    an image pickup device that generates an image data by performing photoelectric conversion of object light by a plurality of pixels, and sequentially reads pixel values of the generated image data;
    a mechanical shutter that controls an exposure time of the image data generated by the image pickup device by controlling shielding and passing of the object light;
    an image pickup control section that controls, when the mechanical shutter is used, sequential reading of the pixel values from the image pickup device after the exposure time elapses and the object light is shielded, and controls, when an electronic shutter is used, sequential resetting of the pixels of the image pickup device and sequential reading of the pixel values from the pixels for which the exposure time elapses;

a gain multiplying section that amplifies the pixel values of the pixels of the image data with a gain which is uniform irrespective of magnitude of the pixel values; and a control section that controls which of the mechanical shutter and the electronic shutter is to be used, and sets the gain to have different values in accordance with which of the mechanical shutter and the electronic shutter is to be used.

2. The image pickup apparatus according to claim 1, further comprising a gamma conversion section that converts the pixel values of the pixels of the image data which are amplified by the gain multiplying section by a gamma curve for changing each pixel value with a different amplification factor in accordance with magnitude of each pixel value, wherein the control section sets the gamma curve differently in accordance with which of the mechanical shutter and the electronic shutter is to be used.

3. The image pickup apparatus according to claim 2, wherein the control section sets the gain, when the electronic shutter is used, such that a pixel value corresponding to a saturation charge amount of a pixel read from the image pickup device is a maximum luminance value, and sets the gain, when the mechanical shutter is used, such that a pixel value corresponding to a saturation charge amount of a pixel which is read last from the image pickup device is a maximum luminance value, to perform the amplification.

4. The image pickup apparatus according to claim 3, further comprising a temperature measuring section that measures a temperature of the image pickup device or a temperature in a vicinity of the image pickup device, wherein the control section sets the gain in accordance with the temperature measured by the temperature measuring section.

5. The image pickup apparatus according to claim 1, further comprising a sensitivity setting section for setting ISO sensitivity, wherein an ISO sensitivity range in which the ISO sensitivity is settable when the mechanical shutter is used is different from an ISO sensitivity range in which the ISO sensitivity is settable when the electronic shutter is used, and the control section, when only one of the electronic shutter and the mechanical shutter is usable with the ISO sensitivity set by the sensitivity setting section, performs control to use the one.

6. The image pickup apparatus according to claim 1, further comprising a luminance distribution detecting section that detect a luminance dynamic range of an object, wherein the control section performs control to use the electronic shutter when the luminance dynamic range is not smaller than a preset threshold value.

7. The image pickup apparatus according to claim 1, further comprising a moving body detecting section that detects a motion amount of an object, wherein the control section performs control to use the mechanical shutter when the motion amount of the object is not smaller than a preset threshold value.

8. The image pickup apparatus according to claim 1, further comprising an exposure value calculation section that calculates a proper exposure value based on luminance of an object, wherein the control section performs control to use the electronic shutter when an exposure value currently set exceeds the proper exposure value calculated by the exposure value calculation section.

9. The image pickup apparatus according to claim 1, further comprising a temperature measuring section that measures a temperature of the image pickup device or a temperature in a vicinity of the image pickup device, wherein the control section performs control to use the electronic shutter when the temperature measured by the temperature measuring section is not lower than a preset threshold value.

10. The image pickup apparatus according to claim 1, further comprising high-dynamic-range synthesizing processing section that synthesizes a high-dynamic-range image data based on a plurality of image data obtained by photographing with different exposures in a high-dynamic-range photographing mode, wherein the control section performs control to use the electronic shutter when the high-dynamic-range photographing mode is set.

11. A control method of an image pickup apparatus that comprises an image pickup device that generates an image data by performing photoelectric conversion of object light by a plurality of pixels, and sequentially reads pixel values of the generated image data, and a mechanical shutter that controls an exposure time of the image data generated by the image pickup device by controlling shielding and passing of the object light, the control method comprising:

an image pickup control step of controlling, when the mechanical shutter is used, sequential reading of the pixel values from the image pickup device after the exposure time elapses and the object light is shielded, and controlling, when an electronic shutter is used, sequential resetting of the pixels of the image pickup device and sequential reading of the pixel values from the pixels for which the exposure time elapses;

a gain multiplying step of amplifying the pixel values of the pixels of the image data with a gain which is uniform irrespective of magnitude of the pixel values; and a control step of controlling which of the mechanical shutter and the electronic shutter is to be used, and sets the gain to have different values in accordance with which of the mechanical shutter and the electronic shutter is to be used.

* * * * *